United States Patent [19]
Wainfan et al.

[11] Patent Number: 5,860,620
[45] Date of Patent: Jan. 19, 1999

[54] RAM WING VEHICLE

[75] Inventors: Barnaby Sam Wainfan, Long Beach; Douglas E. Shultz, Brea; Jeffry Scott Philhower, Westminster, all of Calif.

[73] Assignee: Northrup Grumman Corporation, Los Angeles, Calif.

[21] Appl. No.: 679,351

[22] Filed: Jul. 10, 1996

[51] Int. Cl.[6] .................................................. B64C 21/04
[52] U.S. Cl. ............................ 244/12.1; 244/52; 244/36
[58] Field of Search .................................. 244/12.1, 12.2, 244/12.4, 12.5, 230, 52, 36, 55; 180/116, 117, 126

[56] References Cited

U.S. PATENT DOCUMENTS

| Re. 25,368 | 4/1963 | Rethorst | 244/49 |
|---|---|---|---|
| 2,969,751 | 1/1961 | Toulmin, Jr. | 105/74 |
| 3,135,480 | 6/1964 | Chaplin, Jr. | 244/12.1 |
| 3,276,528 | 10/1966 | Tucknott et al. | 180/7 |
| 3,312,426 | 4/1967 | Fowler | 244/12.5 |
| 3,322,223 | 5/1967 | Bertelsen | 180/7 |
| 3,398,713 | 8/1968 | Hall | 114/67 |
| 3,548,968 | 12/1970 | Aronson | 180/119 |
| 3,572,614 | 3/1971 | Bertelsen | 244/12.1 |
| 3,586,118 | 6/1971 | Bertin | 180/119 |
| 3,630,471 | 12/1971 | Fredericks | 244/36 |
| 3,710,887 | 1/1973 | Van Velduizen | 180/119 |
| 3,786,893 | 1/1974 | Joyce, Jr. et al. | 180/119 |
| 3,810,522 | 5/1974 | Morgan et al. | 180/116 |
| 4,116,405 | 9/1978 | Bacchi et al. | 244/12.4 |
| 4,137,986 | 2/1979 | Schirtzinger | 180/119 |
| 4,151,893 | 5/1979 | Mantle | 180/116 |
| 4,442,986 | 4/1984 | Rousseau | 244/12.1 |
| 5,141,173 | 8/1992 | Lay | 244/2 |

FOREIGN PATENT DOCUMENTS

| 1-83450 | 3/1989 | Japan | 244/12.1 |
|---|---|---|---|
| 5-77789 | 3/1993 | Japan | 244/12.1 |

*Primary Examiner*—Galen L. Barefoot
*Attorney, Agent, or Firm*—Terry J. Anderson; Karl J. Hoch, Jr.

[57] ABSTRACT

A ram wing vehicle comprises a main structure extending between a nose end and a tail end, including an aerodynamic lifting body having an aspect ratio less than approximately 1.0 and extending between a leading edge and a trailing edge. The ratio of the thickness of the lifting body intermediate the leading edge and the trailing edge to the length of the chord thereof is greater than approximately 1:8. A propulsion source is provided adjacent the nose end for generating an efflux and for directing the efflux beyond the tail end in a direction away from the nose end. A directional control mechanism is positioned adjacent the nose end for turning the vehicle about the yaw axis into a curve having a center and so vectoring the efflux from the propulsion source as to direct the efflux to the outside of the turn and the nose end toward the center of the curve. The directional control mechanism includes a yaw control mechanism for vectoring the efflux from the propulsion means about the yaw axis and a pitch control mechanism for vectoring the efflux from the propulsion means about the pitch axis of the main structure. The vehicle has significant cargo carrying capacity and is capable of operating either in ground effect, over terrain, or on water.

30 Claims, 6 Drawing Sheets

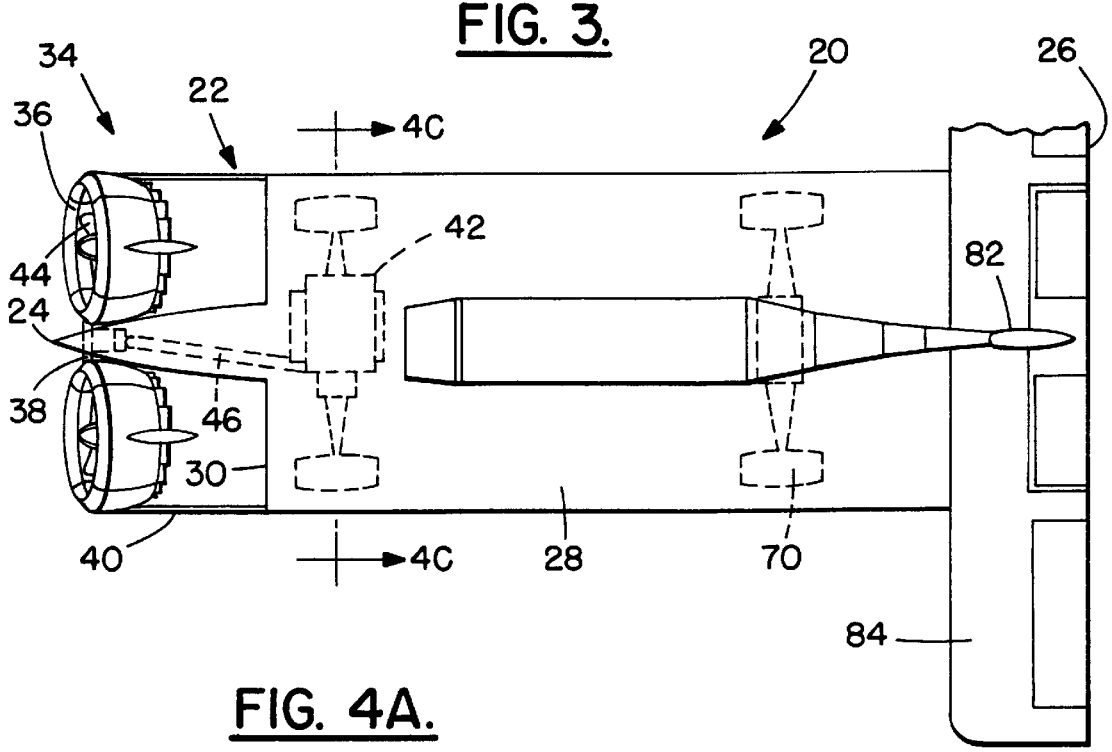
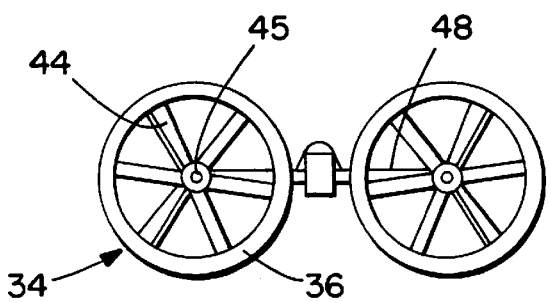
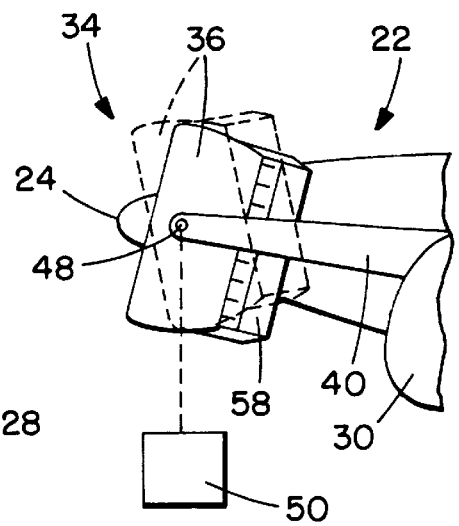
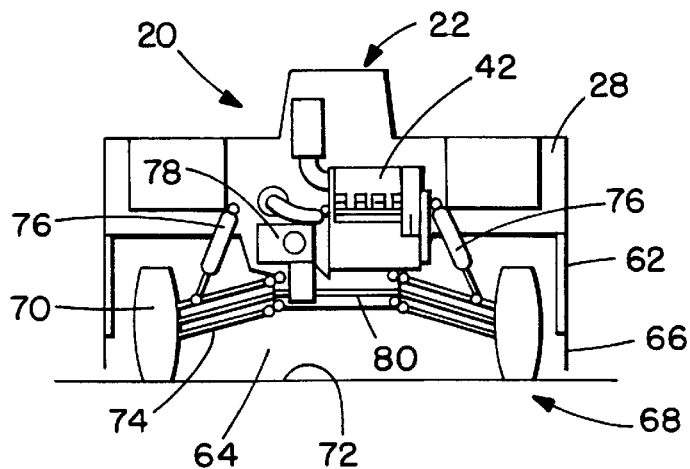

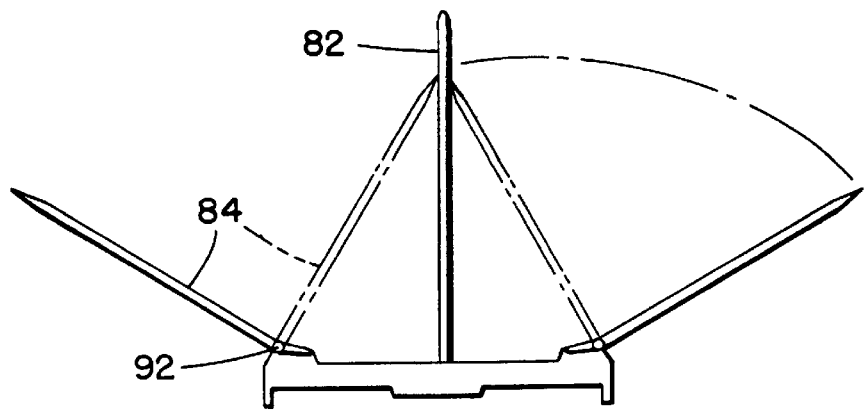
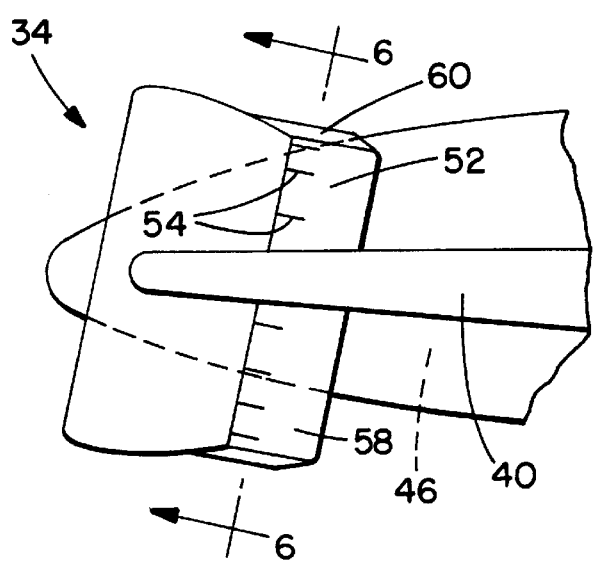
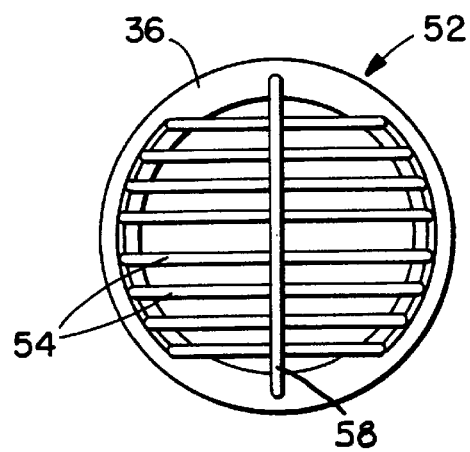
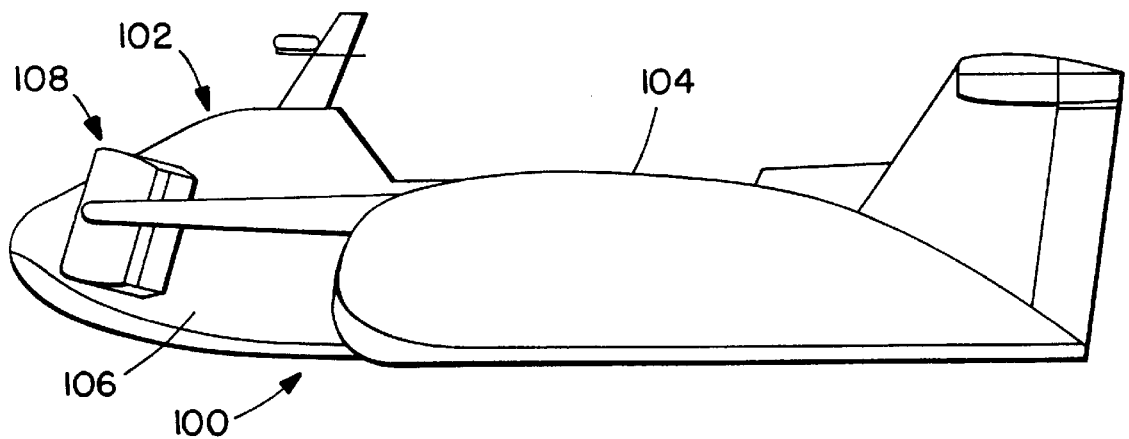

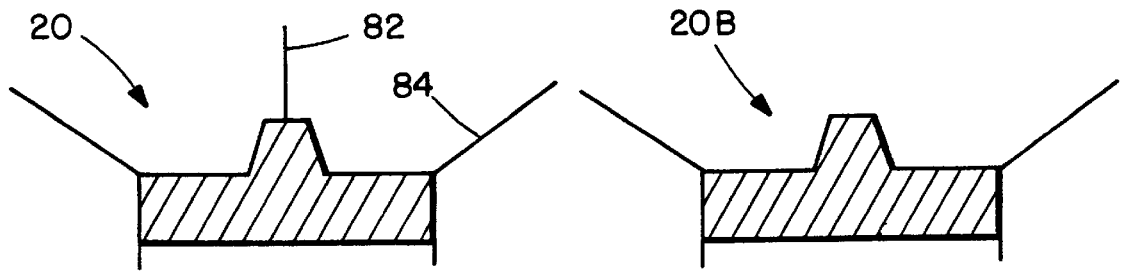
FIG. 7A.
FIG. 7B.
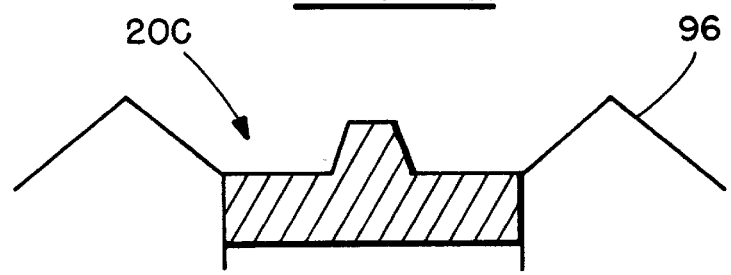
FIG. 7C.
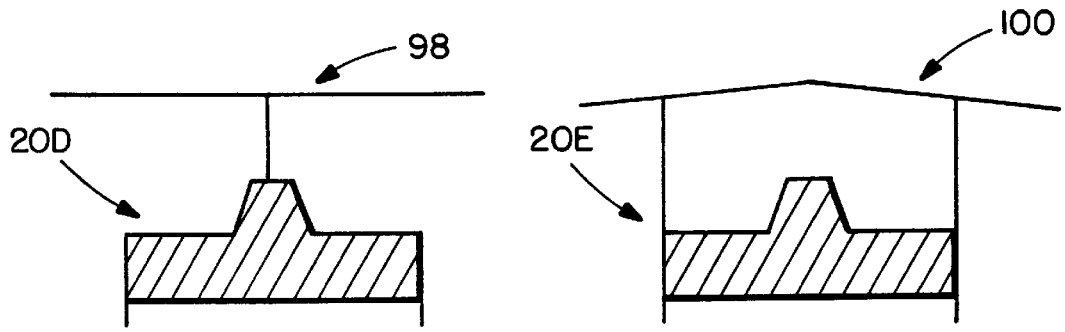
FIG. 7D.
FIG. 7E.
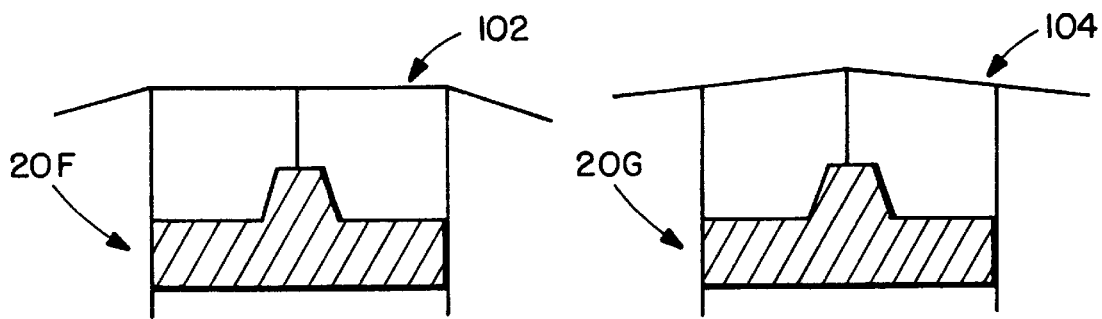
FIG. 7F.
FIG. 7G.

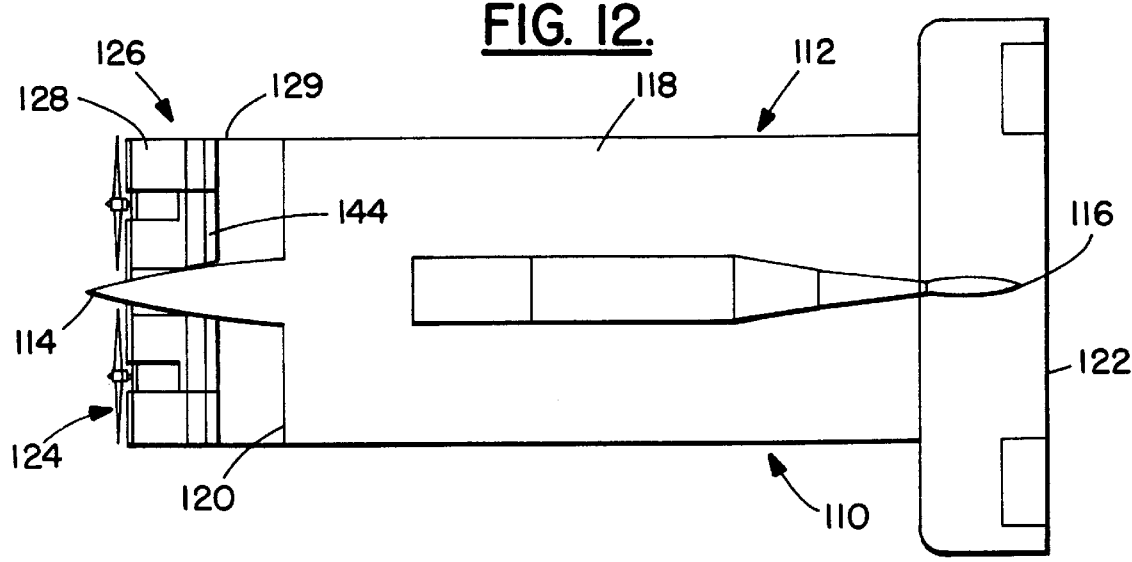
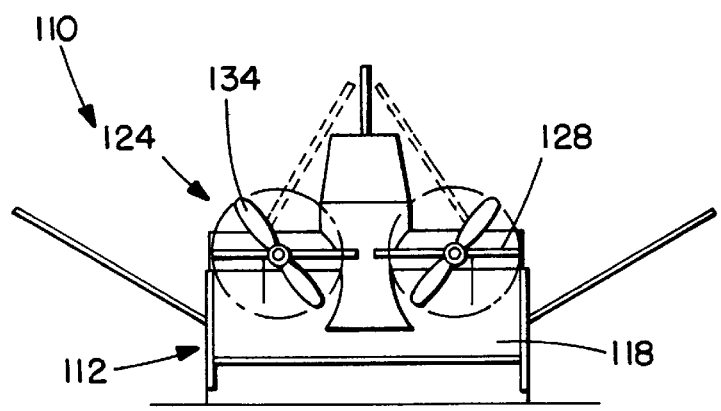
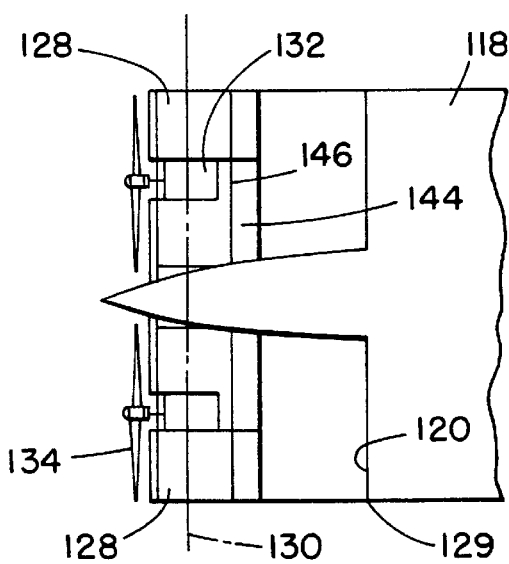
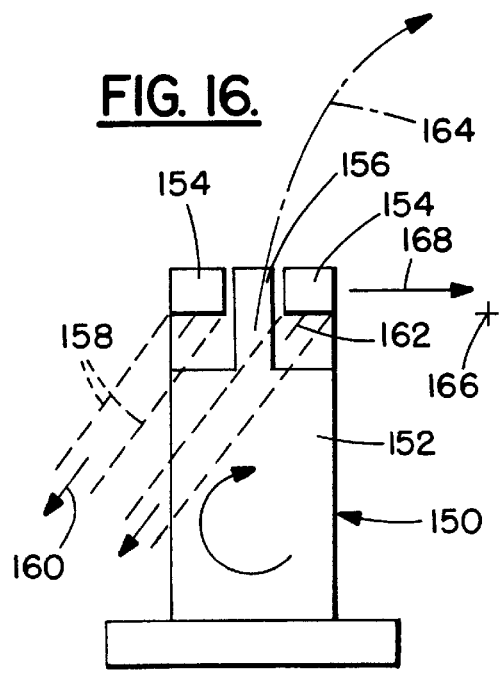

RAM WING VEHICLE

BACKGROUND OF THE INVENTION

1. Field of the Invention

The present invention relates to ground effect vehicles and, more particularly, to a ram wing vehicle that derives lift from an aerodynamic lifting body.

2. Discussion of the Prior Art

Vehicles that are totally or partially supported by air and referred to as ground effect and air cushion vehicles are known in the art. Representative patents in this technology are as follows:

U.S. Pat. No. 5,141,173 issued Aug. 25, 1992 to Lay entitles PRESSURE-JET AND DUCTED FAN HYBRID ELECTRIC CAR discloses a hybrid electric vehicle capable of ground travel and air travel. The vehicle provides for movement over the ground by wheel motors mounted at each of four ground engaging wheels. The wheel motors are supplied with electric power by a battery pack or an electric generator powered by a combustion engine. The combustion engine is also geared to vertically oriented ducted fans and a horizontally oriented ducted fan or propeller for providing the vehicle with the capability of travel through the air. Pressure jets, supplied with compressed air from a compressor driven by the combustion engine, augment the lift of the ducted fans and provide steering for the vehicle. The vehicle can also be provided with photo-electric cells for supplying a portion of the electric power for the vehicle.

U.S. Pat. No. 4,151,893 issued to Mantle on May 1, 1979 entitled WING IN GROUND EFFECT VEHICLE describes a wing in ground effect vehicle, the body of which is a low aspect ratio airfoil. Soft end plates allow for proper sealing of pressure below the wing while preventing the transmittal of wave action forces to the vehicle. Fin rudders and a dorsal fin provide turning control. Afflux from the propulsor engines can be split to flow both over and under the wing so that the vehicle will be capable of both rapid movement and hover over both land and water and the ability to jump out of ground effect mode to avoid obstacles appearing in its flight path.

U.S. Pat. No. 4,137,986 issued Feb. 6, 1979 to Schirtzinger entitled CAPTURED AIR BUBBLE ARCTIC VEHICLE WITH ICE CUTTERS discloses a vehicle for the rapid transport of goods, machinery, and personnel over ice, snow and frozen ground surfaces that is supported partially while at rest and/or under way by a cushion of air which is entrained by a system of seals. Seals along the sides terminate in runners for guiding and partially supporting the vehicles. The vehicle may be self-propelled or towed. Through the use of the air cushion, frictional resistance to movement is substantially reduced, requiring correspondingly less motive power or towing force. Also the load of the vehicle is distributed over a larger area.

U.S. Pat. No. 3,786,893 issued Jan. 22, 1974 to Joyce, Jr. et al. entitled AIR CUSHION VEHICLE WITH SELECTIVELY OPERABLE SURFACE TRACTION MEANS discloses an air cushion vehicle including a rigid body extended along a longitudinal axis thereof, and means for producing an air cushion thereunder; at least two wheels equipped with inflatable tires, the wheels depending downwardly from the rigid body and each wheel being on an opposite side of and laterally spaced from the longitudinal axis of the vehicle; and the wheels being located in the central third portion longitudinally of the vehicle. Means are provided for causing the wheels to selectively engage the surface underneath the vehicle and means for driving the wheels independently in the same direction or in opposite directions, and at the same speed or at different speeds. Also, means are provided for selectively braking the wheels, whereby to assist in propulsion of the vehicle on inclined surfaces, and in the steering of the vehicle during maneuverings over ground or water surfaces.

U.S. Pat. No. 3,810,522 issued May 14, 1974 to Morgan et al. entitled AIR-CUSHION SUPPORTED VEHICLES describes a ground effect vehicle or hovercraft that has a main power plant or prime mover driving pumps from which hydrostatic circuits transmit power to individual hydraulic motors coupled, respectively, to the fan supplying air to the supporting ground cushion and to the drive propellers and other auxiliary facilities. The prime mover and principal mechanical components, as well as the control cabin of the vehicle, are built into a powered module that can be docked or mounted on any one of a number of platforms, which platforms are purpose-built for the functions the total vehicle is to perform and are provided with detachable skirts to retain the supporting air cushion.

U.S. Pat. No. 3,710,887 issued Jan. 16, 1973 to Van Veldhuizen entitled AIR CUSHION VEHICLE WITH SUPPLEMENTAL SUPPORT WHEELS INCLUDING CENTRIFUGAL FAN MEANS discloses a vehicle body including opposite side and end peripheral skirt portions which project at least slightly downwardly below a central underportion of the body in order to define a downwardly opening central chamber. Longitudinally spaced portions of the side walls of the body include horizontal openings formed therethrough adjacent the lower extremities of the side walls and opening into longitudinal air plenums defined within the side walls. The plenums open downwardly and inwardly into the opposite sides of the central chamber and axial intake driven blower wheels are supported within the air plenums in registry with the inner ends of the horizontal openings and are operative to draw ambient air into the air plenum chambers from the exterior of the body through the horizontal openings for subsequent discharge downwardly and inwardly into the central chamber, whereby a vehicle supporting air cushion is formed in the central chamber. The blower wheels include peripheral load supporting tread portions and are vertically shiftable between upper and lower positions spaced above and lowered into rolling contact with a vehicle body supporting surface disposed beneath the vehicle body and along which the body is to be moved.

U.S. Pat. No. 3,586,118 issued Jun. 22, 1971 to Bertin entitled GROUND-EFFECT MACHINES HAVING IMPROVED GUIDING AND PROPELLING MEANS discloses a ground effect machine borne on the ground in part by one or more pressure fluid cushions an in part by one or more wheels for guiding and driving said machine, the degree of ground engagement of said wheel or wheels being controllable by means of jacks, thereby to adjust the weight proportion of said machine shared by said cushions and said wheels.

U.S. Pat. No. 3,548,968 issued Dec. 22, 1970 to Aronson entitled AIR SUPPORTED ELECTRIC VEHICLE discloses a vehicle which is supported by propelling members which propel the vehicle along the face of the earth and includes air directing means which serves to decrease the weight which the propelling means support. In one embodiment, fan blades are rotated to pull streams of air through a number of holes in the housing of a wheeled vehicle and into an area between two concentric, cylindrical, flexible skirts to form a cushion which partially supports the weight of the vehicle.

A movable plate can be rotated or moved to alter the amount of air flowing through the holes. The fan blades may be driven through gears from a small wheel which contacts the ground. Coils may be wound on the blades and magnets disposed about the path of the blades so that currents are induced in the coils which can be rectified are used to recharge the batteries.

U.S. Pat. No. 3,398,713 issued Aug. 27, 1958 to Hall entitled TRACTIVE AIR CUSHION VEHICLE discloses an air cushion amphibious vehicle capable of both air-borne and overland travel, including fore and aft large inflatable rollers which support the vehicle for overland operation and are deflatable and retractable for water borne operation. During airborne operation, the surfaces of the rollers receive air under superatmospheric pressure from an air chamber, which exhausts through a levitation jet channel formed between a respective roller surface and a portion of the vehicle body. The rollers are rotated in a direction to direct at least a portion of the air in the levitation jet channel underneath the vehicle in the air cushion region to maintain a vortex of air around at least a portion of each roller surface when the vehicle is supported on the cushion.

U.S. Pat. No. 3,322,223 issued May 30, 1967 to Bertelsen entitled GROUND EFFECT MACHINES discloses a ground effect machine that can hover at low speeds as well as operate at high speeds. The craft is substantially a biplane construction, however, one modification shows a ducted structure which is in effect a relatively thick cord monoplane and having boundary layer control for further augmenting aerodynamic lift.

The ground effect machine has a feature of so controlling the aerodynamic and aerostatic forces that the center of lift and the center of gravity of the craft remain substantially in vertical alignment for both low and high speed operation thereof. The draft comprises movable parts which change the effective plan area acted on by static pressure to cause the area to have a center of static pressure substantially in registry with the center of lift of the machine.

U.S. Pat. No. 3,276,528 issued Oct. 4, 1966 to Tuchnott et al. entitled GROUND EFFECT VEHICLE WITH APPLIED DIFFERENTIAL TORQUE STEERING MEANS discloses a gaseous jet thrust supported vehicle comprising in combination: a vehicle body, road wheels journalled on said body and supporting the same on the ground, a prime mover, a plurality of ducted fans mounted along the front edge, the rear edge and the lateral edges of said body and capable of being geared to said prime mover, in operation producing an outer and inner jet cushion enclosing at least one ground effect in cushion of substantially rectangular plan form and having a substantially vertically momentum thrust of a magnitude less than a weight of the vehicle but exceeding the magnitude required for statically hovering at a steady hovering height and propulsion means capable of being geared to said prime mover, in operation imparting a substantially horizontal thrust to the vehicle, said combination of vertical and horizontal thrust generating means enabling the vehicle to leap over obstacles of predetermined length and height, but not to sustain free flight above said steady hovering height.

It was in light of the foregoing that the present invention was conceived and has now been reduced to practice.

SUMMARY OF THE INVENTION

The present invention relates to a ram wing vehicle which comprises a main structure extending between a nose end and a tail end, including an aerodynamic lifting body having an aspect ratio less than approximately 1.0 and extending between a leading edge and a trailing edge. The ratio of the thickness of the lifting body intermediate the leading edge and the trailing edge to the length of the chord thereof is greater than approximately 1:8. A propulsion source is provided adjacent the nose end for generating an efflux and for directing the efflux beyond the tail end in a direction away from the nose end. A directional control mechanism is positioned adjacent the nose end for turning the vehicle about the yaw axis into a curve having a center and so vectoring the efflux from the propulsion source as to direct the efflux to the outside of the turn and the nose end toward the center of the curve. The directional control mechanism includes a yaw control mechanism for vectoring the efflux from the propulsion means about the yaw axis and a pitch control mechanism for vectoring the efflux from the propulsion means about the pitch axis of the main structure. The vehicle has significant cargo carrying capacity and is capable of operating either in ground effect, over terrain, or on water.

This vehicle configuration employs a low-aspect-ratio wing with power-augmented ram technology to minimize liftoff speed while providing a vehicle which is narrow enough for on-road ground operation. The thick low-aspect-ratio wing contains side pods housing powered wheels. The center-body is capable of carrying two crew members (side by side/tandem) and equipment. Airborne propulsion is provided by a pair of ducted fans mounted forward on each side of the center body. The fans incorporate pivoting vanes which direct the fan afflux under the wing to provide power-augmented ram (PAR) lift for low-speed lift-off.

When in flight, the vehicle is stabilized by aerodynamic stabilizers mounted at the rear of the vehicle. These surfaces also improve span efficiency when the machine is flown at greater-than-ideal height for clearance over obstacles and rough-surface terrain. The stabilizers can be folded to minimize vehicle width for wheel-driven ground operations. Directional stability and control, when airborne, are provided by a single vertical tail.

The vehicle can operate over land, swamp and water, and will float if forced to land on water. Fully-amphibious capability is possible with the addition of hydroskis.

The vehicle has the capability to hop over obstacles such as walls, fences, river banks, docks, etc. It is height-stable when flying in ground effect and is aerodynamically stable both in and out of ground effect.

Three propulsion techniques may be employed for the vehicle. The first technique utilizes a reciprocating internal combustion engine to drive a generator which powers electric motors at each wheel and ducted fan. This technique also allows the vehicle to move on the ground on battery power for short distances. In this mode, the internal combustion engine is shutdown, giving the vehicle very low acoustic and IR signatures.

The second propulsion techniques includes a turbine or engine with shaft drive and clutch to the ducted fans and a generator for electric drive to the wheels, and the third propulsion technique uses separate internal-combustion engines driving the wheels and ducted fans.

Other features and options include for the vehicle exhaust outlet placement on the bottom of the wing for IR and noise suppression, a sensor pod mounted high on the tail with a wide field of view, addition to hydroskis to provide fully-amphibious capability.

A primary object of the present invention, then, is to provide a ram wing vehicle operable over land, swamp and water.

Another object of the present invention is to provide a ram wing vehicle capable of traveling over obstacles such as walls, fences, river banks and docks.

A further object of the present invention is to provide a ram wing vehicle that is height-stable when operating in ground effect and is aerodynamically stable both in and out of ground effect operation.

Other and further features, advantages and benefits of the invention will become apparent in the following description taken in conjunction with the following detailed description and the claims. However, it must be understood that the following detailed description and the drawings are exemplary and explanatory but are not to be restrictive of the invention, merely serving to explain the principles of the invention in general terms. Like numerals refer to like parts throughout the disclosure.

BRIEF DESCRIPTION OF THE DRAWINGS

FIG. 3 is a top plan view of the ram air vehicle illustrated in FIG. 1;

FIG. 4A is a detail front elevation view of components illustrated FIG. 4;

FIG. 4B is a detail side elevation view of components illustrated in FIG. 2 and illustrating a mechanism for moving certain parts thereof between extreme positions;

FIG. 4C is a detail cross section view taken generally along sine 4C—4C in FIG. 3;

FIG. 4D is a detail front elevation view of components illustrated FIG. 4;

FIG. 5 is a detail side elevation view of components illustrated in FIG. 2;

FIG. 6 is a detailed elevation view taken generally along line 6—6 in FIG 5;

FIGS. 7A 7B, 7C, 7D, 7E, 7F and 7G are all front elevation views, in silhouette, illustrating diagrammatically different constructions of empennages which can be employed by the ram air vehicle of the invention;

FIG. 8 is a side elevation view of another embodiment of the ram air vehicle illustrated in FIG. 1;

FIG. 12 is a top plan view of the embodiment of the ram air vehicle illustrated in FIG. 11;

FIG. 13 is a front elevation view of the embodiment of the ram air vehicle illustrated in FIG. 11;

FIG. 15 is a detail top plan view of structure illustrated

FIG. 16 is a diagrammatic top elevation view of a ram air vehicle embodying the invention and illustrating an inventive feature thereof.

DETAILED DESCRIPTION OF THE PREFERRED EMBODIMENT

Figure 1:
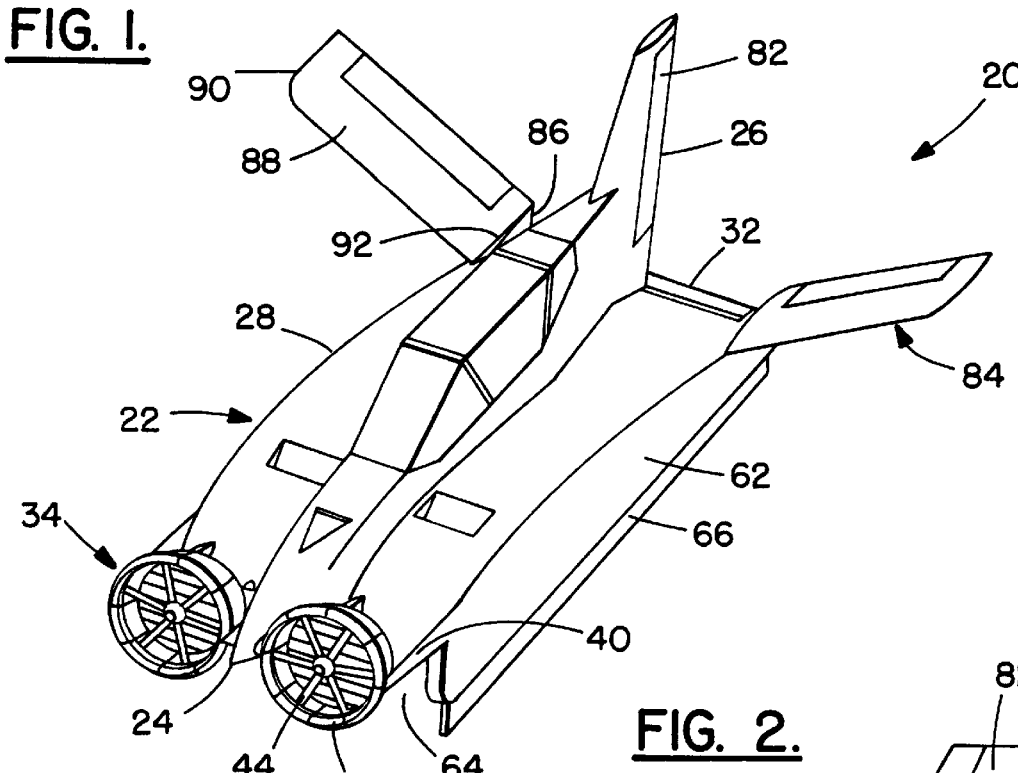
FIG. 1 is perspective view of one embodiment of a ram air vehicle of the invention.
Figure 2:
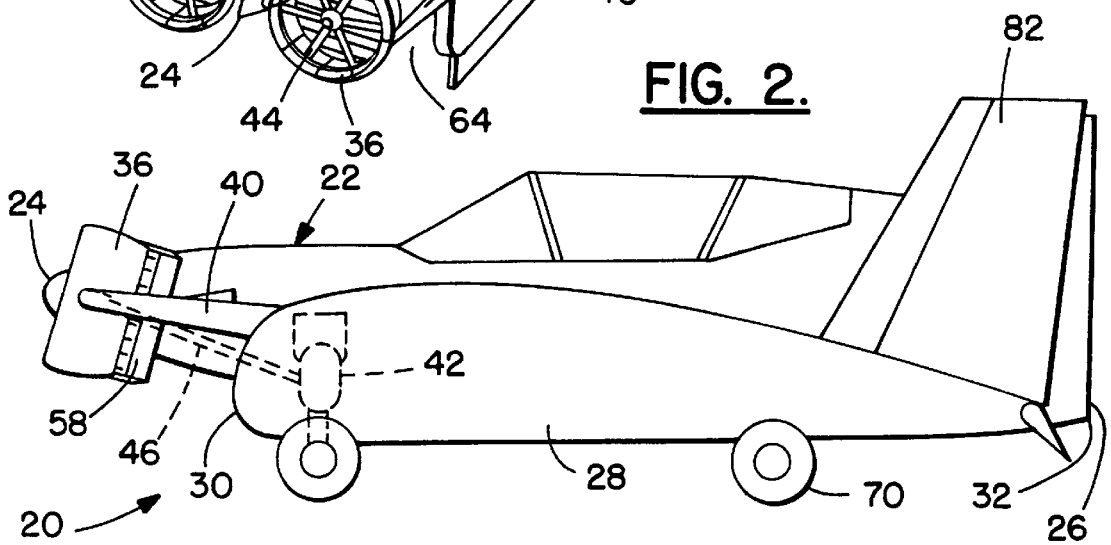
FIG. 2 is a side elevation view of the ram air vehicle illustrated in FIG. 1.

Turn now to the drawings and, initially, to FIGS. 1–4 which provide various views of a ram wing vehicle 20 embodying the invention. The ram wing vehicle 20 comprises a main structure 22 having yaw, pitch and roll axes and extends between a nose end 24 and a tail end 26 and includes an integral aerodynamic lifting body 28 having an aspect ratio less than approximately 1.0. The lifting body 28 extends between a leading edge 30 and a trailing edge 32. Additionally, for purposes of the invention, it is desirable that the ratio of the thickness of the aerodynamic lifting body intermediate the leading edge and the trailing edge to the length of the chord of the lifting body is greater than approximately 1:8 in order to provide optimized strength and internal volume for carriage of cargo, fuel and/or passengers.

A pair of propulsion mechanisms 34 are located adjacent and to either side of the nose end 24 of the main structure 22 for generating an efflux and for directing the resulting efflux toward the lifting body 28. Each propulsion mechanism 34 includes an annular duct 36 mounted on the nose end 24 by means of a pylon 38 and mounted on the lifting body 28 by a cantilevered strut 40. A powerplant 42, which may be, for example, an internal combustion engine, is suitably mounted within the main structure 22. A fan 44 is mounted within the annular duct 36 for rotation about a fan axis 45 (FIG. 4A) which is coaxial with a longitudinal axis of the annular duct. A drive shaft 46 extends between and is suitably coupled to both the powerplant and to the fan.

In one embodiment, each annular duct 36 may be fixed to the pylon 38 and to the strut 40. In another embodiment, the annular ducts may be pivotally mounted on the main structure for rotation about an axis 48 parallel to the pitch axis of the vehicle 20. In this embodiment, a suitable actuator mechanism 50, diagrammatically depicted, may be employed for selectively moving the annular ducts between a maximum positive angle of attack position as indicated by the use of solid lines in FIG. 4B and a maximum negative angle of attack position as indicated by the use of dashed lines in that same figure.

In either of the embodiments just described, suitable directional control expedients may be provided intermediate the propulsion mechanism 34 and the lifting body 28 for vectoring the efflux about at least the pitch and yaw axes. Consider first a pitch control mechanism 52 for vectoring the efflux from the fan 44 about the pitch axis of the vehicle. Viewing FIGS. 5 and 6, the pitch control mechanism 52 includes one or more elevator vanes 54, each being pivotally mounted on the annular duct 36 for rotation about an axis which is parallel to the pitch axis of the vehicle. When the construction of the pitch control mechanism 52 calls for more than one elevator vane, it is preferred that there be a plurality of generally equally spaced, vertically, elevator vanes 54 (see FIG. 6), all pivotally mounted on the annular duct for rotation about axes which are parallel to the pitch axis of the vehicle.

It will be appreciated that when the propulsion mechanism 34 utilizes the pitch control mechanism 52, pitch adjustment may be provided solely by means of the pitch control mechanism or in combination with operation of the actuator mechanism 50 or even in combination with control surface on the empennage.

In a similar fashion, consider a yaw control mechanism 56 for vectoring the efflux from the fan 44 about the yaw axis of the vehicle. Viewing FIG. 5, the yaw control mechanism 56 includes one or more rudder vanes 58, each pivotally mounted on spaced rudder struts 60 projecting aft from the annular duct 36, each being rotatable about an axis which is parallel to the yaw axis of the vehicle. When the construction of the yaw control mechanism 56 calls for more than one rudder vane, it is preferred that there be a plurality of generally equally spaced, laterally, rudder vanes 58, all pivotally mounted on associated rudder struts 60 on the annular duct for rotation about axes which are parallel to the yaw axis of the vehicle. While a plural construction of rudder vanes 58 has not been illustrated, it would be generally similar to the plural construction of elevator vanes 54 as depicted in FIG. 6. Also, rudder vanes 58 may be operated in combination with control surfaces on the empannage for yaw control.

Figure 4:
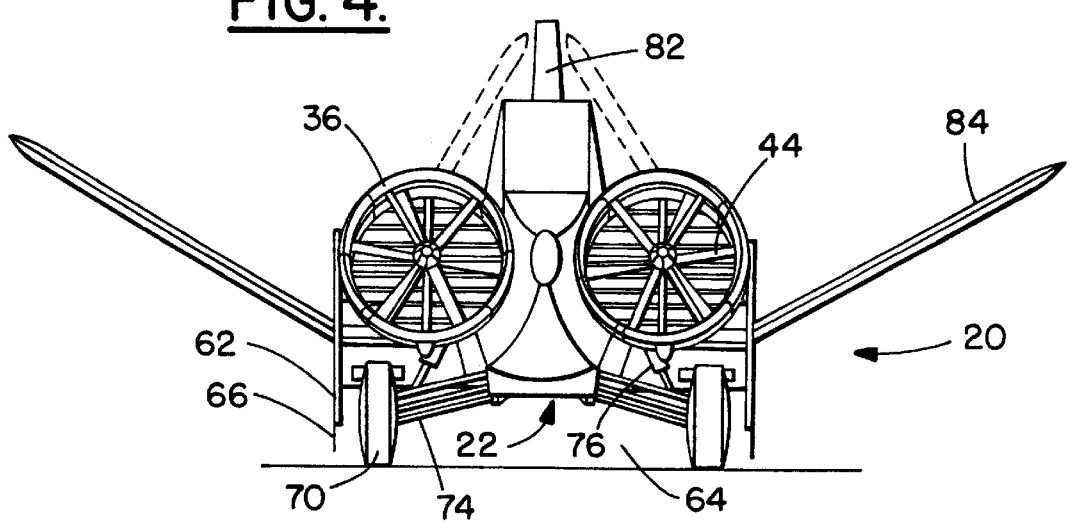
FIG. 4 is a front elevation view of the ram air vehicle illustrated in FIG. 1.
Figure 14:
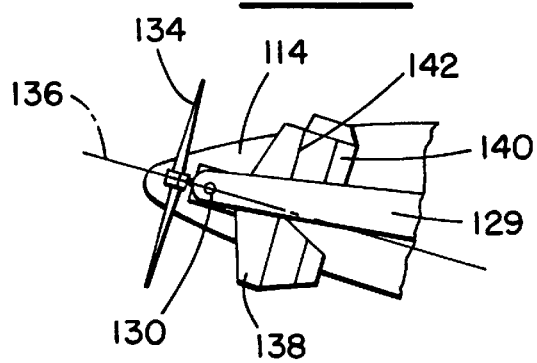
FIG. 14 is a detail side elevation view of structure illustrated in FIG. 11.

As seen in FIGS. 1, 4, and 4C, the vehicle 20 may includes a pair of elongated skirt members 62 lying in substantially parallel spaced apart planes extending downwardly from the aerodynamic lifting body 28 so as to define a plenum 62,for supporting the vehicle when the vehicle is in the ground effect mode. The skirt members may be rigid or may be at least partially composed of flexible material 66.

The vehicle 20 is also provided with an undercarriage 68 affixed to the main structure 22 as best seen in FIG. 4C. The undercarriage may be in the form of skids, skis, or the like but is illustrated as including wheels 70 capable of supporting the vehicle on a generally level surface 72 and for travelling along the surface. As illustrated, each wheel 70 has its individual axle 74 and associated shock absorber 76. A suitable coupling mechanism in the form of a transmission 78 and transaxle 80 serves to selectively operatively connect the powerplant 42 and the front wheels 70 for driving the wheels enabling the vehicle to progress along the surface when not in the ground effect mode.

The ram wing vehicle 20 is provided with a suitable empennage at the tail end 26 for stabilizing the vehicle during flight. To this end, in the embodiment of FIGS. 1–6, the empennage includes a vertical fin 82 lying generally in a plane of the roll and yaw axes of the vehicle. It also includes a pair of generally horizontal stabilizers 84 mounted at inboard ends on the lifting body 28 and extending away therefrom in mutually opposite directions. The term "generally horizontal" is understood to include any usual dihedral existing between the stabilizers and the lifting body. Viewing FIG. 1, each horizontal stabilizer 84 is seen to include an inboard portion 86 fixed to the lifting body 28 and an outboard portion 88 having a tip end 90 and is movable between a retracted position (as indicated by dashed lines in FIG. 4D) at which the tip end is proximate the vertical fin 82 and an extended position (as indicated by solid lines in FIG. 4D) at which the tip end is distant from the vertical fin. A stabilizer hinge 92 extends generally parallel to the roll axis of the vehicle for pivotally joining the inboard portion 86 and the outboard portion 88.

A variety of constructions of empennages capable of use with the ram air vehicle of the invention are illustrated in FIGS. 7A–7G. FIG. 7A generally depicts the embodiment just described. In FIG. 7B, a ram wing vehicle 20B is depicted as including a pair of V-stabilizers 94 mounted at inboard ends on the lifting body and extending away therefrom in mutually opposite directions with a substantial dihedral. In this instance, the vehicle 20B lacks a vertical fin such that the V-stabilizers assume the dual role of a horizontal stabilizer and fin-rudder arrangement. The V-stabilizers 20B may also fold in the manner of the stabilizers 84 as previously described.

In FIG. 7C, a ram wing vehicle 20C is diagrammatically depicted in front view as including a pair of gull-wing stabilizers 96; in FIG. 7D, a vehicle 20D has a T-tail configuration 98; in FIG. 7E, a vehicle 20E has a twin fin-rudder T-tail configuration 100; in FIG. 7 F, a vehicle 20F has a triple fin-rudder configuration 102 with level stabilizer inboard portions and inverted dihedral outboard portions; and in FIG. 7G, a vehicle 20G has a triple fin-rudder configuration 104 with inverted dihedral stabilizer inboard and outboard portions.

In each of the embodiments depicted in FIGS. 7A–7G, the horizontal stabilizer portion may fold generally in the manner of the stabilizers 84.

Figure 9:
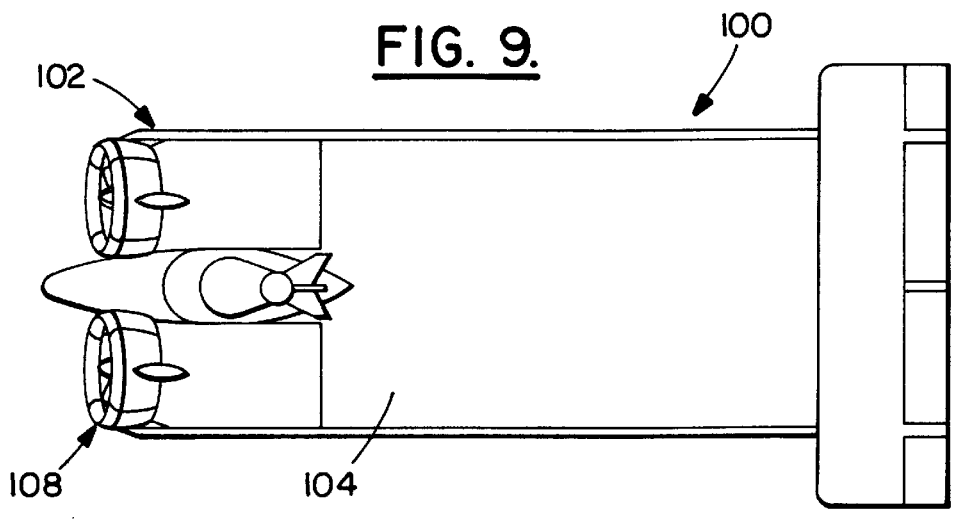
FIG. 9 is a top plan view of the embodiment of the ram air vehicle illustrated in FIG. 8.
Figure 10:
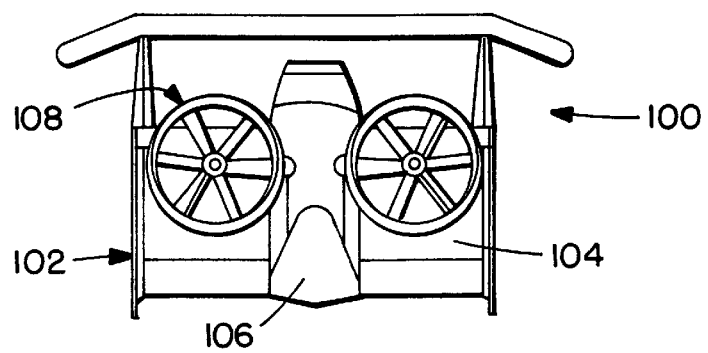
FIG. 10 is a front elevation view of the embodiment of the ram air vehicle illustrated in FIG. 8.
Figure 11:
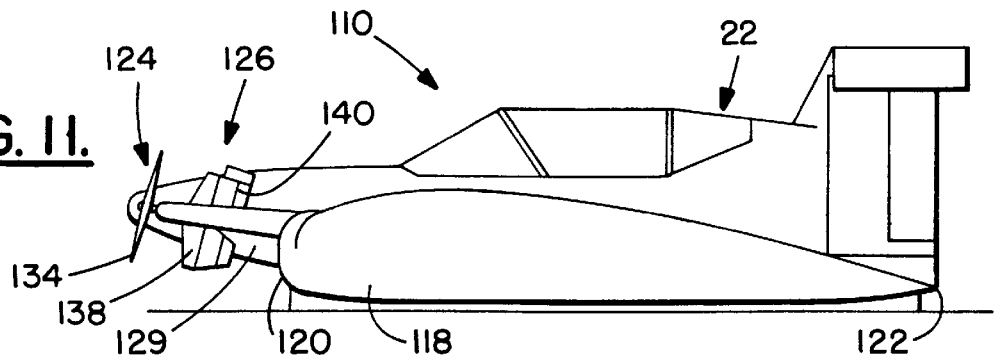
FIG. 11 is a side elevation view of still another embodiment of the ram air vehicle illustrated in FIG. 1.

Although the ram wing vehicle of the invention has been described thus far as being operable from a solid surface, it may be desirable for it to be operable from a body of water. As seen in FIGS. 8–10, another embodiment of a ram wing vehicle is identified by reference numeral 100. As in the previously described embodiment, the vehicle 100 includes a main structure 102 and an aerodynamic lifting body 104. The main structure 102 includes a hull 106 sealed for buoyancy and shaped for stability in water enabling the vehicle to alight on and take off from water. Also as in the previous embodiment, the modified vehicle 100 includes suitable propulsion mechanisms 108 for providing the thrust necessary to enable such movement by the vehicle.

Still another embodiment of the invention is illustrated in FIGS. 11–15 and will now be described. In this regard, a modified ram wing vehicle 110 comprises a main structure 112 having yaw, pitch and roll axes and extending between a nose end 114 and a tail end 116 and including an aerodynamic lifting body 118 having an aspect ratio less than approximately 1.0 and extending between a leading edge 120 and a trailing edge 122. A propulsion mechanism 124 is positioned adjacent the nose end 114 for generating an efflux and for directing the efflux therefrom toward the lifting body 118 and a directional control mechanism 126 is provided intermediate the propulsion mechanism and the lifting body for vectoring the efflux from the propulsion means about at least the yaw and pitch axes.

A pair of opposed foreplanes 128 are mounted on the main structure 112 proximate the nose end 114 and extend laterally in opposite directions between the nose end and associated supporting struts 129 which are integral with and project forwardly from opposite sides of the lifting body 118. The foreplanes are suitably pivotally mounted for limited rotation about a foreplane axis 130 which is parallel to the pitch axis for the vehicle 110. The foreplanes are selectively movable between a maximum positive angle of attack position and a maximum negative angle of attack position in a manner as previously described with respect to the propulsion mechanism 34 and as illustrated in FIG. 4B.

In actual fact, the propulsion mechanism 124 includes a suitable powerplant 132 mounted on each of the foreplanes and a propeller 134 connected to and driven by each such powerplant for rotation about a propeller axis 134. The powerplant 132 may be an electric motor energized by batteries (not shown) within the main structure 112 although various other types of prime movers such as internal combustion engines or gas turbines may be employed.

The directional control mechanism 126 provides both yaw control for vectoring the efflux from the propeller 134 about the yaw axis of the vehicle 110 and pitch control for vectoring the efflux about the vehicle's pitch axis. Specifically, yaw control is provided by a generally upright fin 138 mounted on the foreplane and extending transversely of the foreplane. In one instance, a rudder 140 may be hinged on the upright fin 138 for pivotal movement about a rudder axis 142 parallel to the yaw axis of the vehicle 110 and positioned so as to be in the efflux from the propeller. In another instance, the entire fin 138 and rudder 140 may operate as a unit for pivotal movement about the rudder axis 142.

Pitch control is provided by an elevator flap 144 hinged on each foreplane 128 for pivotal movement about an elevator flap axis 146 parallel to the pitch axis of the vehicle 110 and positioned so as to be in the efflux from the propeller.

Although not illustrated with any degree of specificity, the modified ram wing vehicle 110 may be provided with a suitable undercarriage of any type as previously described including the capability for movement across a surface, whether hard, soft, or water. In a similar manner, the vehicle 110 may also be provided with any suitable form of empennage including those various forms illustrated in FIGS. 7A–7G.

Turning now to FIG. 16, it will be understood that a primary feature of the invention as just described in various embodiments is the provision of a ram wing vehicle 150 including an aerodynamic lifting body 152 having an aspect ratio less than approximately 1.0 and propulsion mechanisms 154 adjacent a nose end 156 of the vehicle for generating an efflux depicted as an airstream generally bounded by dashed lines 158 and having a thrust vector indicated by arrows 160 for directing the efflux therefrom toward the lifting body and further including directional control mechanisms represented by upright fins 162 adjacent the nose end for turning the ram wing vehicle about the yaw axis into a curve 164 having a center 166 and so vectoring the efflux from the propulsion mechanisms as to direct the efflux to the outside of the turn and the nose end toward the center of the curve as depicted by an arrow 168.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A ram wing vehicle comprising:
   a main structure having yaw, pitch and roll axes and extending between a nose end and a tail end and including an aerodynamic lifting body having an aspect ratio less than approximately 1.0 and extending between a leading edge and a trailing edge;
   propulsion means adjacent said nose end for generating an efflux and for directing the efflux therefrom toward said lifting body; and
   directional control means intermediate said propulsion means and said lifting body for vectoring the efflux from said propulsion means about at least the yaw and pitch axes.

2. A ram wing vehicle as set forth in claim 1 wherein said directional control means includes:
   yaw control means for vectoring the efflux from said propulsion means about the yaw axis of said main structure; and
   pitch control means for vectoring the efflux from said propulsion means about the pitch axis of said main structure.

3. A ram wing vehicle as set forth in claim 2 wherein said pitch control means includes:
   a transversely extending foreplane;
   means pivotally mounting said foreplane on said main structure for selective movement between a maximum positive angle of attack position and a maximum negative angle of attack position.

4. A ram wing vehicle as set forth in claim 3 wherein said yaw control means includes:
   a generally upright fin mounted on said foreplane and extending transversely thereof; and
   a rudder hinged on said upright fin for pivotal movement about an axis parallel to the yaw axis and positioned so as to be in the efflux from said propulsion means.

5. A ram wing vehicle as set forth in claim 3 wherein said yaw control means includes:
   a generally upright fin mounted on said foreplane and extending transversely thereof, said fin being pivotally moveable about an axis parallel to the yaw axis and positioned so as to be in the efflux from said propulsion means.

6. A ram wing vehicle as set forth in claim 3 wherein said pitch control means includes:
   an elevator hinged on said foreplane for pivotal movement about an axis parallel to the pitch axis and positioned so as to be in the efflux from said propulsion means.

7. A ram wing vehicle as set forth in claim 1 including:
   undercarriage means affixed to said main structure and capable of supporting said vehicle on a generally level surface.

8. A ram wing vehicle as set forth in claim 1 wherein the ratio of the thickness of said aerodynamic lifting body intermediate said leading edge and said trailing edge to the length of the chord thereof is greater than approximately 1:8.

9. A ram wing vehicle as set forth in claim 3 wherein said propulsion means includes:
   a powerplant mounted on said foreplane; and
   a propeller driven by said powerplant for rotation about a propeller axis.

10. A ram wing vehicle as set forth in claim 1 including:
    a pair of elongated skirt members lying in substantially parallel spaced apart planes extending downwardly from said aerodynamic lifting body so as to define a plenum for supporting said vehicle when said vehicle is in the ground effect mode.

11. A ram wing vehicle as set forth in claim 10 wherein said skirt members are partially composed of flexible material.

12. A ram wing vehicle as set forth in claim 1 wherein said propulsion means includes:
    annular duct means having a longitudinal axis mounted on said main structure adjacent said nose end;
    a powerplant mounted on said main structure;
    a fan mounted within said duct means for rotation about a fan axis which is coaxial with the longitudinal axis of said duct means; and
    shaft means coupling said fan to said powerplant.

13. A ram wing vehicle as set forth in claim 12 including:
    means pivotally mounting said annular duct means on said main structure for rotation about an axis parallel to the pitch axis; and
    actuator means for selectively moving said duct means between a maximum positive angle of attack position and a maximum negative angle of attack position.

14. A ram wing vehicle as set forth in claim 12 wherein said directional control means includes:
    yaw control means for vectoring the efflux from said fan about the yaw axis of said main structure; and
    pitch control means for vectoring the efflux from said fan about the pitch axis of said main structure.

15. A ram wing vehicle as set forth in claim 14 wherein said pitch control means includes:

an elevator vane pivotally mounted on said annular duct means for rotation about an axis which is parallel to the pitch axis of said vehicle.

16. A ram wing vehicle as set forth in claim 14 wherein said pitch control means includes:

a plurality of vertically spaced elevator vanes pivotally mounted on said annular duct means for rotation about axes which are parallel to the pitch axis of said vehicle.

17. A ram wing vehicle as set forth in claim 14 wherein said yaw control means includes:

a rudder vane pivotally mounted on said annular duct means for rotation about an axis which is parallel to the yaw axis of said vehicle.

18. A ram wing vehicle as set forth in claim 14 wherein said yaw control means includes:

a plurality of laterally spaced rudder vanes pivotally mounted on said annular duct means for rotation about axes which are parallel to the yaw axis of said vehicle.

19. A ram wing vehicle as set forth in claim 1 including:

undercarriage means affixed to said main structure and including wheels capable of supporting said vehicle on a generally level surface and for travelling along the surface.

20. A ram wing vehicle as set forth in claim 1 including:

coupling means selectively operatively connecting said propulsion means and said wheels for driving said wheels to progress along the surface.

21. A ram wing vehicle as set forth in claim 1 including:

empennage means on said main structure at said tail end for stabilizing said vehicle during flight.

22. A ram wing vehicle as set forth in claim 21 wherein said empennage means includes:

a vertical fin lying generally in a plane of the roll and yaw axes; and a pair of generally horizontal stabilizers mounted at inboard ends on said lifting body and extending away therefrom in mutually opposite directions.

23. A ram wing vehicle as set forth in claim 22 wherein each of said horizontal stabilizers includes:

an inboard portion fixed to said lifting body;

an outboard portion having a tip end and movable between a retracted position whereat said tip end is proximate said vertical fin and an extended position whereat said tip end is distant from said vertical fin; and stabilizer hinge means extending generally parallel to the roll axis of said vehicle for pivotally joining said inboard portion and said outboard portion.

24. A ram wing vehicle as set forth in claim 21 wherein said empennage means includes:

a pair of V-stabilizers mounted at inboard ends on said lifting body and extending away therefrom in mutually opposite directions.

25. A ram wing vehicle as set forth in claim 24 wherein each of said V-stabilizers includes:

an inboard portion fixed to said lifting body;

an outboard portion having a tip end and movable between a retracted position whereat said tip ends are mutually proximate and an extended position whereat said tip ends are mutually distant; and stabilizer hinge means extending generally parallel to the roll axis of said vehicle for pivotally joining said inboard portions and said outboard portions.

26. A ram wing vehicle as set forth in claim 21 wherein said empennage means includes:

a vertical fin lying generally in a plane of the roll and yaw axes and extending to an uppermost tip; and a horizontal stabilizer mounted to said uppermost tip of said vertical stabilizer and extending away therefrom in opposite directions.

27. A ram wing vehicle as set forth in claim 26 wherein said horizontal stabilizer includes:

first and second inboard portions fixed to said vertical stabilizer;

first and second outboard portions, each having a tip end and being movable between a retracted position whereat said tip ends are mutually proximate and an extended position whereat said tip ends are mutually distant; and stabilizer hinge means extending generally parallel to the roll axis of said vehicle for pivotally joining said first inboard portion and said first outboard portion and for pivotally joining said second inboard portion and said second outboard portion.

28. A ram wing vehicle as set forth in claim 1 wherein said main structure includes a hull sealed for buoyancy and shaped for stability in water enabling said vehicle to alight on and take off from water.

29. A ram wing vehicle comprising:

a main structure having yaw, pitch and roll axes and extending between a nose end and a tail end and including an aerodynamic lifting body having an aspect ratio less than approximately 1.0 and extending between a leading edge and a trailing edge;

propulsion means adjacent said nose end for generating an efflux and for directing the efflux therefrom toward said lifting body; and directional control means adjacent said nose end of said main structure for turning said ram wing vehicle about the yaw axis into a curve having a center and so vectoring the efflux from said propulsion means as to direct the efflux to the outside of the turn and said nose end toward the center of the curve.

30. A ram wing vehicle comprising:

a main structure having yaw, pitch and roll axes and extending between a nose end and a tail end and including an aerodynamic lifting body having an aspect ratio less than approximately 1.0 and extending between a leading edge and a trailing edge;

propulsion means for generating an efflux directed beyond said tail end in a direction away from said nose end; and directional control means on said main structure for turning said ram wing vehicle about the yaw axis into a curve having a center and so vectoring the efflux from said propulsion means as to direct the efflux to the outside of the turn and said nose end toward the center of the curve.

* * * * *